March 18, 1958 R. D. LAUGHLIN 2,827,401
METAL OXIDE RECTIFIERS
Filed Aug. 19, 1954
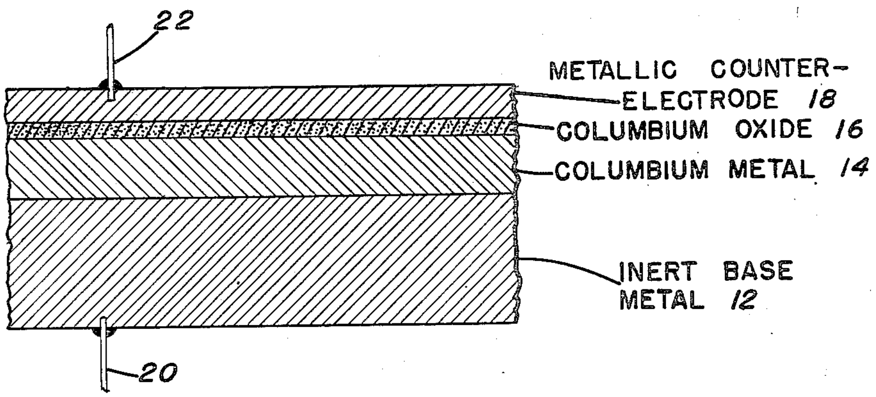
INVENTOR
Robert D. Laughlin
BY W. E. Thibodeau, A. W. Dew and J. D. Edgerton ATTORNEYS 2,827,401
Patented Mar. 18, 1958

1

2,827,401

METAL OXIDE RECTIFIERS

Robert D. Laughlin, State College, Pa., assignor to the United States of America as represented by the Secretary of the Army Application August 19, 1954, Serial No. 451,078
1 Claim. (Cl. 117—200)
(Granted under Title 35, U. S. Code (1952), sec. 266)

The invention described in the specification and claim may be manufactured and used by or for the Government for governmental purposes without the payment to me of any royalty thereon.

This invention relates to electrical rectifiers or unidirectional conducting devices, and more particularly to rectifiers of the type having a layer of semiconducting metallic oxide in contact with a metal. It is a feature of the invention to provide an improved rectifier in which the active materials are metallic columbium and columbium oxide.

It is well known that asymmetric conduction may occur at the contact between a metal and a semiconductor—that is, electrical current will flow across the contact more readily in one direction than in the other. Well known examples of such semiconductor rectifiers are those in which the active materials are (1) copper and cuprous oxide, (2) selenium, and (3) magnesium and copper sulfide. A newer metal-oxide type of rectifier using titanium and titanium oxide offers certain advantages over earlier types.

Unfortunately, the earlier types of semiconductor rectifiers are quite limited in their high-temperature capabilities. And while the newer titanium dioxide rectifiers are better at high temperatures than the older rectifiers, they have a ratio of forward to reverse conductivity that is undesirably low for some applications.

An object of my invention is to provide an economical, easily fabricated semiconductor rectifier having a high ratio of forward to reverse conductivity, capable of satisfactory operation at relatively high temperatures, and capable of handling large currents.

Other objects, aspects, uses, and advantages of the invention will become apparent from the accompanying drawing and from the following description.

The figure is a cross section of a rectifier according to the invention.

In the figure, reference numeral 12 designates a layer of inert base metal. In contact with base layer 12 is a columbian metal layer 14. On top of columbian metal layer 14 is a thin columbian oxide layer 16. On top of layer 16 is a metallic counterelectrode 18. Electrical connections to the rectifier are made to base 12 and counterelectrode 18 by means of electrical conductors 20 and 22 respectively.

The thickness of the columbium metal layer 14 and the nature of its bond or contact with inert base metal 12

2 are not particularly critical. Preliminary experiments suggest that one satisfactory method of fabrication would be to form a thin film of columbium metal on an inert base metal by vacuum evaporation.

Oxide layer 16 is preferably formed by heating the columbium metal layer 14 in water vapor at one atmosphere pressure at a temperature of about 550°–600° C. for about 3 hours. I have found that the temperature is not particularly critical, but temperatures below 450° C. result in slow formation of oxide and are somewhat undesirable. Temperatures of the order of 700° C. will work, but the characteristics of the resulting oxide layer are less desirable.

Semiconducting layers of less efficiency and uniformity of thickness may also be prepared by heating the base metal in air at temperatures of the order of 250° C. to 700° C.

Oxide layers formed in air are in general more completely oxidized than those formed by steam treatment. Thin layers completely oxidized by air treatment are good insulators and impart an objectionably high forward resistance to the rectifier. Layers formed by properly controlled steam treatment, on the other hand, have low forward resistance.

The counterelectrode 18 is preferably formed by electrodeposition or vacuum evaporation on oxide layer 16. Although various counterlectrode metals can be used, the nature of the counterelectrode metal has been found to affect the properties of the completed rectified. Good results have been obtained with copper counterelectrodes deposited from copper sulphate baths and with silver counterelectrodes deposited from silver cyanide baths.

A typical rectifier according to my invention, having an area of 0.1 cm.$^2$, passed 70 milliamperes D. C. in the forward direction when 1.32 volts was applied; the resistance of this sample was thus about 20 ohms in the forward direction. In the back direction the resistance was 1.2 megohms at 5 volts.

It will be apparent that the embodiment shown is only exemplary and that various modifications can be made in construction and arrangement within the scope of the invention as defined in the appended claim.

I claim:

In the fabrication of a columbium oxide rectifier, the method of forming an oxide-containing layer on a columbium layer which method consists of treating said columbium layer with steam at a temperature between 500° and 650° C.

References Cited in the file of this patent

UNITED STATES PATENTS

| | | |
|---|---|---|
| 1,678,824 | Ruben | July 31, 1928 |
| 1,900,018 | Lilienfeld | Mar. 7, 1933 |
| 1,919,988 | Rupp | July 25, 1933 |
| 2,182,377 | Guanella | Dec. 5, 1939 |
| 2,221,596 | Lorenz | Nov. 12, 1940 |
| 2,531,535 | Sheppard et al. | Nov. 28, 1950 |